Figure 1:
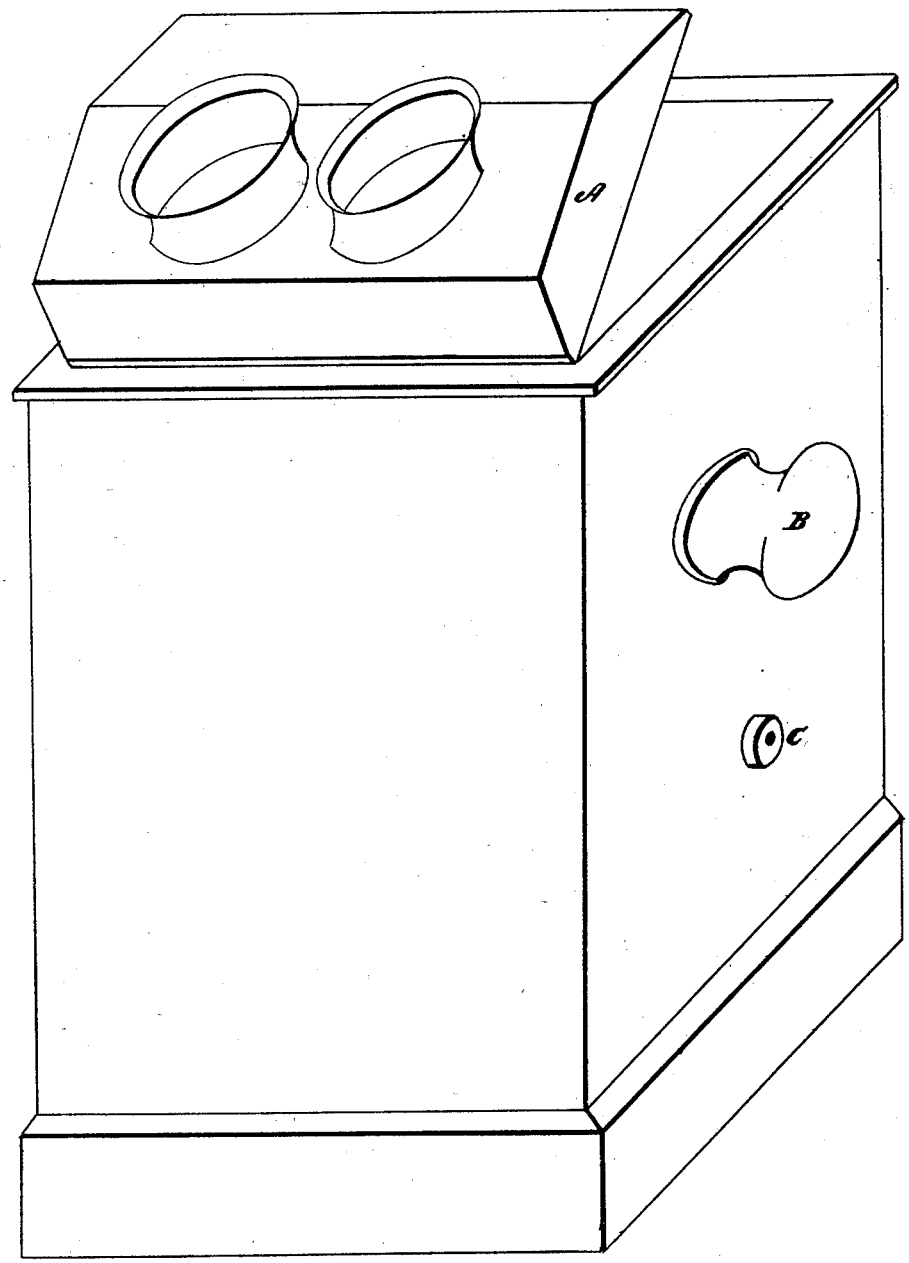

A. BECKERS.

Exhibiting Stereoscopic Pictures.

No. 23,438.

2 Sheets—Sheet 1.

Patented April 5, 1859.

Witnesses.
Chs. Wehle
443 Broadway N.Y.
L. Wehle.

Inventor:
Alex Beckers.

A. BECKERS.
Exhibiting Stereoscopic Pictures.
No. 23,438.
2 Sheets—Sheet 2.
Patented April 5, 1859.
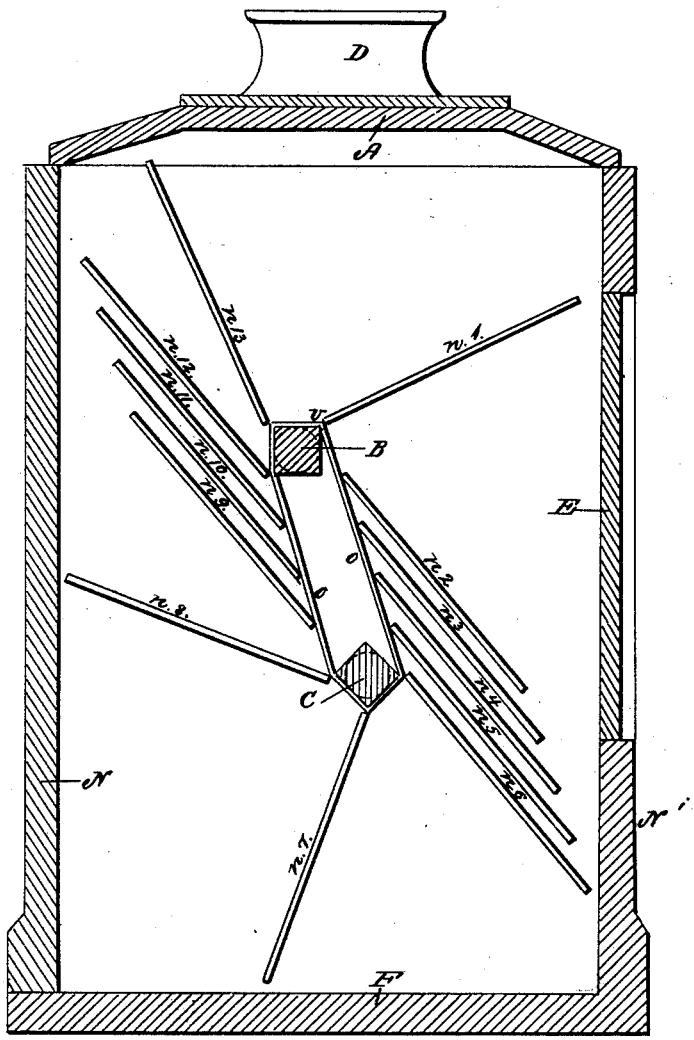

UNITED STATES PATENT OFFICE.

ALEXANDER BECKERS, OF NEW YORK, N. Y.

APPARATUS FOR EXHIBITING STEREOSCOPIC PICTURES.

Specification of Letters Patent No. 23,438, dated April 5, 1859.

*To all whom it may concern:*

Be it known that I, ALEXANDER BECKERS, of the city, county, and State of New York, have invented new and useful Improvements in Apparatus for Exhibiting Stereoscopic and other Pictures; and I do hereby declare that the following is a full, clear, and exact description of the same, reference being had to the annexed drawings, making part of this specification, in which—

Figure 1, is a perspective view, Fig. 2, a vertical cross-section of the said apparatus.

Similar letters of reference indicate corresponding parts in these various figures.

I deem it proper to state, that the apparatus for exhibiting stereoscopic and other pictures, for which I have obtained Letters Patent dated April 7, 1857, was extensively introduced into public use, and the improvements hereinafter described, refer to the same apparatus; they being made, for the purpose of increasing the capacity of the said apparatus (for containing and exhibiting pictures) without increasing the size of the said apparatus.

The nature of my invention consists in constructing an apparatus for exhibiting stereoscopic pictures, which said apparatus will be capable of containing a greater number of pictures than any other apparatus of an equal size; by placing the endless belt or chain in an oblique position to the base of the apparatus; and by placing the slides or frames of the pictures in an oblique position to the said endless belt.

To enable others skilled in the art to make and use my invention I will proceed to describe its construction and operation.

My improved apparatus consists of the box or chamber A E N′ F N, the eyeglasses D, D, the upper roller B, the lower roller C, the endless belt $o$ $o$, the picture frames $n^1$, $n^2$, $n^3$, $n^4$, $n^5$, $n^6$, and so forth, embracing the whole number of pictures contained in the said chamber; and the handle B′.

The box or chamber consists of the top A, the sides N′, N, the window E and the base F. The drawings represent the box of a rectangular shape, which I deem the most convenient form for the purpose.

The eyeglasses D D are placed on the top of the box, and as the said top is movable on the front part (of the box) in such a manner that it may be fixed to any angle required, the view obtained through the said eyeglasses will be most clear and distinct, when the said top is in a position parallel with the position of the picture, to be exhibited as represented in Fig. 1.

The two rollers B and C are not placed in a vertical position to the base F; but in such a manner that a line through their respective centers would form an angle of about 70 degrees with the base of the box; consequently the endless belt $o$, $o$, passing over the said rollers will also form an angle of about 70 degrees with the said base.

The slides or frames or pictures from $n^1$ to $n^{13}$ form an angle of about 155 degrees with the said endless belt, or with the line of motion. The handle B′ forms the continuation of the roller B, and when the said handle is turned from the left to the right, the pictures $n^1$, $n^2$, $n^3$, $n^4$, &c. will also be turned from the left to the right, and will be brought to view successively in the order in which they are placed on the endless belt.

It will be observed, that a great economy of space is effected by this position of the belt and the pictures, as compared with the vertical position of the line of motion and the rectangular position of the pictures described in my former patent already referred to.

On the roller B being turned, the picture $n^1$, will come into the position of $n^{13}$, next into $n^{12}$, then to $n^{11}$, then to $n^{10}$, then to $n^9$, then to $n^8$. In this position the picture requires the greatest width or breadth, and this breadth is provided by the position of the lower roller C which on this side is in a greater distance from N, than on any other point. When the picture assumes the position of $n^6$, on the opposite side, the breadth required is diminished by the fact, that it forms a very large obtuse angle with the vertical side N′, and it remains in a position parallel to this until it enters into the position of $n^1$, when the larger breadth required is afforded by the greater distance of the roller B from the side N′. In this manner a box of smaller width is required for the same size and number of pictures, than in my former apparatus. And a saving of height or elevation of box is effected by the fact, that the oblique or lateral position of the endless belt $o$ $o$ requires less vertical height of box, than the same belt would require if placed in a vertical position to the base.

The construction of the rollers B and C, of the endless belt, of the slides, frames and pictures; and the manner of connecting these parts, are described in my former patent, to which I have referred.

The apparatus at present constructed contain from twelve to three hundred pictures, and the saving of space effected by the improvements described will amount to about thirty per cent. on the average.

Having thus described the construction and operation of my invention what I claim as new and desire to secure by Letters Patent is—

1. Placing the endless belt, chain band or apron $o\ o$ in such a position as to form an acute or obtuse angle with the base F of the box or chamber of the apparatus substantially as described.

2. Placing the slides or frames holding the pictures in such a position as to form acute or obtuse angles with the endless belt, or with the line of motion substantially in the manner and for the purpose as described.

Dated New York, March 4, 1859.

ALEX. BECKERS.

Witnesses:
   CHARLES WEHLE,
   T. WEHLE.